Figure 3:
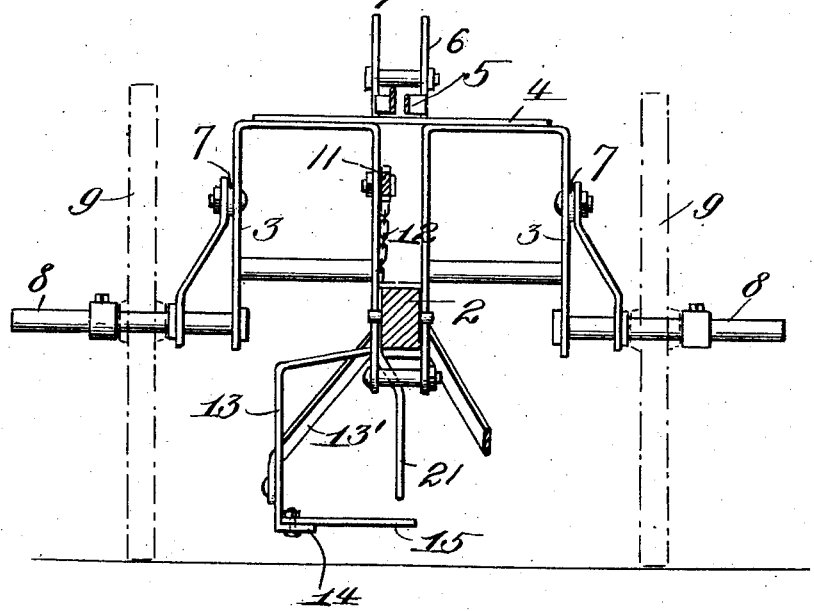

No. 846,323. PATENTED MAR. 5, 1907.
J. LE BLANC.
CANE STUBBLE CUTTER AND DESTROYER.
APPLICATION FILED JULY 12, 1906.
2 SHEETS—SHEET 1.
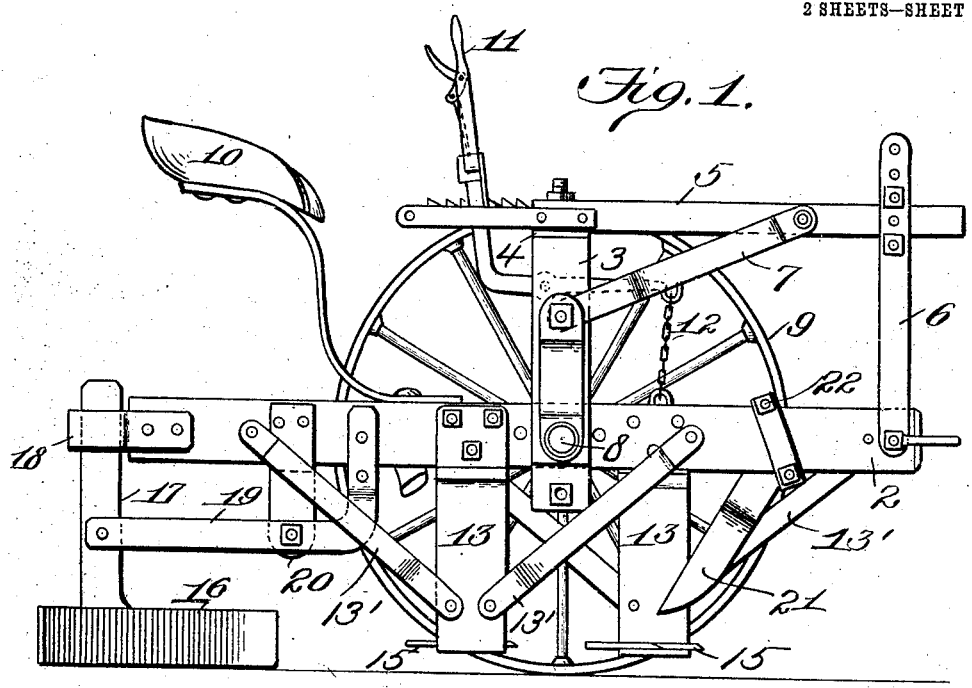
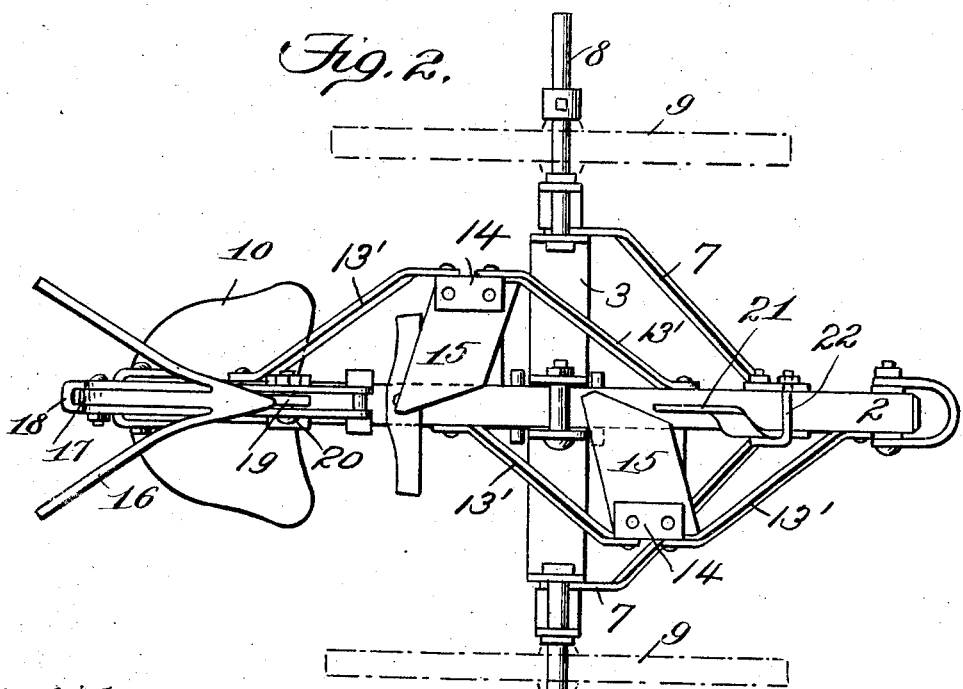
Witnesses:
Inventor
Jules Le Blanc
By James L. Norris.
Atty.

No. 846,323. PATENTED MAR. 5, 1907.
J. LE BLANC.
CANE STUBBLE CUTTER AND DESTROYER.
APPLICATION FILED JULY 12, 1906.

2 SHEETS—SHEET 2.

Witnesses:
C. Hesler
J. O'Keefe

Inventor
Jules Le Blanc
By James L. Norris
Atty.

THE NORRIS PETERS CO., WASHINGTON, D. C.

UNITED STATES PATENT OFFICE.

JULES LE BLANC, OF JEANERETTE, LOUISIANA, ASSIGNOR OF ONE-FOURTH TO PHILIP J. HEBERT, ONE-FOURTH TO HELAIRE T. HEBERT, AND ONE-FOURTH TO FELIX J. HEBERT, OF JEANERETTE, LOUISIANA.

CANE-STUBBLE CUTTER AND DESTROYER.

No. 846,323.      Specification of Letters Patent.      Patented March 5, 1907.

Application filed July 12, 1906. Serial No. 325,964.

*To all whom it may concern:*

Be it known that I, JULES LE BLANC, a citizen of the United States, residing at Jeanerette, in the parish of Iberia and State of Louisiana, have invented new and useful Improvements in Cane-Stubble Cutters and Destroyers, of which the following is a specification.

This invention relates to what I shall for convenience designate a "cane-stubble cutter and destroyer."

An implement including my invention may be advantageously used in many different connections—for example, on a sugar plantation for cutting the stubble or cane stumps or for destroying and removing such stubble. In addition to this the device is of such a construction that it may be converted readily into a harrow.

The implement is simple in construction and effective in operation and in addition possesses other features of utility which will be set out fully in the following description, while the novelty of said invention will be included in the claims succeeding said description.

In the drawings accompanying and forming part of this specification I illustrate in detail one form of embodiment of the invention, which to enable those skilled in the art to practice the same will be described hereinafter in detail. Certain changes may, however, be made within the scope of my said claims.

Figure 4:
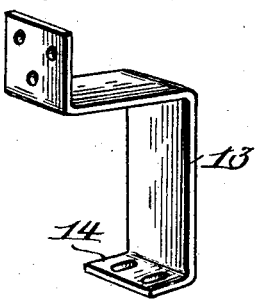
Figure 5:
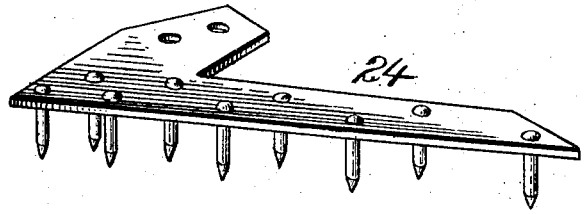
Figure 6:
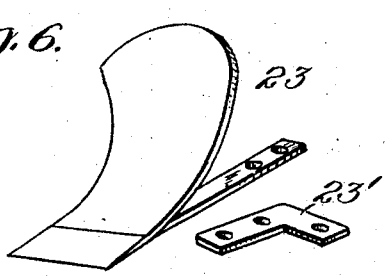

Referring to said drawings, Figure 1 is a side elevation of the implement with the wheel in the foreground removed. Fig. 2 is a bottom plan view of said implement, and Fig. 3 is a transverse vertical section of the same. Figs. 4, 5, and 6 are detail views, Fig. 4 representing a standard, Fig. 5 a harrow member, and Fig. 6 a plowshare.

Like characters refer to like parts throughout the several figures.

The machine shown in the drawings includes in its makeup a beam, as 2, which may be made from any suitable material—such, for example, as metal. This beam 2 has attached to opposite sides thereof between its ends inverted substantially U-shaped members 3, the sides of which are suitably braced. The laterally-separated U-shaped members have attached to their tops the plate 4, to which is suitably fastened the auxiliary beam 5, the latter extending forward from said plate and being adjustably clamped near its forward end between the sides of an upright 6, rising from and pivotally attached to the forward end of the beam 2, said beam being provided in practice with any suitable means for the connection therewith of one or more draft-animals. Other means, however, may be provided for pulling the implement across a cornfield. Braces, as 7, are attached to the opposite sides of the auxiliary beam 5, between the ends thereof, extend downwardly and rearwardly therefrom, and are fastened to the outer sides of the inverted-U-shaped members 3. The outer branches of these U-shaped members are provided with spindles 8, constituting together an axle for the vehicle and upon which are rotative suitable wheels, as 9, held on the spindles in any desirable way.

To the rear of the U-shaped members 3 and connected suitably with the beam 2 is a seat, as 10, for the driver of the machine, and within easy reach of said driver is a hand-lever 11 of substantially L-form and the shorter branch of which is pivotally supported upon the inner branch of one of said U-shaped members 3. To the forward terminal portion of the short branch of this hand-lever 11 is connected a link, as 12, of some suitable kind connected at its lower end with the beam 2. By manipulating the lever the beam 2 may be readily raised or lowered to adapt it to particular conditions, it moving when adjusted upon its pivot associated with the upright 6. In connection with this hand-lever 11 I provide the usual rack and detent or dog to hold the beam in its adjusted position. To the opposite sides of the beam 2 are fastened rigidly the standards 13, having at their lower extremities inturned feet or flanges 14, to which are removably fastened the cutters 15. By removing these cutters 15 plowshares may be substituted therefor or harrows may be used in lieu thereof to adapt the implement to the particular work to which it is to be put. From the standards 13 to the beam 2 braces, as 13', extend. When the implement is equipped with the cutters or knives and when the same is drawn across a field, these knives or cutters will cut off the stubble above the ground, assuming that the row of stubble is substantially midway between the wheels. The inner portions of the two knives or cutters are in overlapping planes longitudinally of the beam 2.

To the rear of the cutters or knives is located an automatically-operative scraper 16, shown as consisting of two wings or flukes converging toward the front of the machine and suitably attached to the opposite faces of the horizontal portion of the substantially angular standard 17, the vertical portion of the latter working through a guide-loop, as 18, attached to and extending rearwardly from the rear of the beam 2. A lever is shown at 19, said lever being fulcrumed between its ends to the bracket 20, shown as depending from the beam 2 just beneath the seat 10. The rear end of this lever 19 is shown as pivoted to the vertical portion of the standard 17, while the forward end of said lever is bifurcated to embrace or substantially embrace the beam 2. The scraper as the implement is moved forward directs the cut stubble laterally and forms the same in two separated straight rows.

I have shown a colter 21, such colter serving to divide the stubble and to insure the same coming within the range of action of the two cutters 15. This colter is represented as connected to the forward end of the beam by a U-bolt 22.

To employ the implement as a stubble-destroyer, I take off the cutters or knives 15 from the standards 13 and attach to the feet of said standards plowshares, as 23, and at the same time remove the scrapers 16. I may utilize the implement as a harrow, in which event I dismount the cutters 15 and attach to the feet 14 harrow members, as 24. The scraper 16 is automatic in its action. It will be understood that it is mounted for automatic rising and falling motion, so that it can properly conform to any inequalities in the ground. In connection with each of the plowshares 23 I provide a strap or equivalent device, as 23', for angularly adjusting the said plowshares. There are two straps—one for the left plowshare and the other for the right plowshare.

What I claim is—

1. The combination of a beam, stubble-cutting knives associated with said beam, a lever, a standard connected with the lever, a guide member connected with the beam and through which said standard projects, and a scraper carried by said standard for directing the stubble cut by said knives in lateral directions.

2. The combination of a beam, stubble-cutting knives associated with said beam, a lever fulcrumed between its ends, the forward portion of the lever straddling the beam, a standard having a vertical and a horizontal portion, the vertical portion being jointed with the rear end of said lever, a scraper fastened to the horizontal portion of said standard and serving to direct the stubble cut by said knives in lateral directions, and a guide member through which the vertical portion of said standard works.

3. The combination of a beam, standards depending from said beam, stubble-cutting knives attached removably to said standards, a lever fulcrumed between its ends and having a portion straddling said beam, a standard having vertical and horizontal portions, the vertical portion being connected with said lever, a scraper connected with the horizontal portion of said last-mentioned standard and for directing stubble cut by said knives in lateral directions, and a guide member on the beam through which the vertical portion of said last-mentioned standard works.

In testimony whereof I have hereunto set my hand in presence of two subscribing witnesses.

JULES LE BLANC.

Witnesses:
C. BERGERON,
GASTON DOMINGUES.